United States Patent [19]

Banowitz

[11] 4,158,064

[45] Jun. 12, 1979

[54] MELTABLE HARD CANDY ARTICLE

[75] Inventor: Benjamin Banowitz, North Miami Beach, Fla.

[73] Assignee: TV Time, Inc., Chicago, Ill.

[21] Appl. No.: 868,815

[22] Filed: Jan. 12, 1978

[51] Int. Cl.² ............................................. A23G 3/00
[52] U.S. Cl. ..................................... 426/76; 426/143; 426/144; 426/660; 426/511; D1/12
[58] Field of Search ................. 426/143, 144, 76, 104, 426/514, 103, 660, 506, 509, 510, 511; D1/12, 99

[56] References Cited

U.S. PATENT DOCUMENTS

| | | | |
|---|---|---|---|
| 1,087,335 | 2/1914 | Swartz | 426/144 |
| 1,537,669 | 5/1925 | Griffith | 426/514 X |
| 1,581,772 | 4/1926 | Williams | 426/104 X |
| 1,915,392 | 6/1933 | Thomson | 426/660 |
| 2,106,097 | 1/1938 | Homan | 426/104 |
| 2,217,392 | 10/1940 | Warfield | 426/414 |
| 2,461,399 | 2/1949 | Strausser | 426/103 |
| 3,632,357 | 1/1972 | Childs | 426/660 |
| 3,826,857 | 7/1974 | Horn et al. | 426/660 |
| 3,863,020 | 1/1975 | Robinson | 426/393 X |
| 3,950,567 | 4/1976 | Tomlinson | 426/660 X |

FOREIGN PATENT DOCUMENTS

| | | | |
|---|---|---|---|
| 935322 | 10/1973 | Canada | 426/103 |
| 2324343 | 12/1974 | Fed. Rep. of Germany | 426/660 |

*Primary Examiner*—Steven L. Weinstein
*Attorney, Agent, or Firm*—Merriam, Marshall & Bicknell

[57] ABSTRACT

A flat bar of precooked stable hard candy having a low moisture content which is rapidly meltable to form a brittle, non-sticky glaze coating on a confection or food item and having good shelf life and packaging characteristics with the hard candy bar having a generally planar main body secion provided with spaced supporting projections extending downwardly a short distance from the lower surface thereof and a depending skirt section extending downwardly a like distance along the entire periphery of the bar to form an enclosure below the main body section for retaining fluid and melted syrup during heating thereof in a cooking vessel so as to effect more rapid melting of the bar without burning or scorching the hard candy. In some embodiments the hard candy bar is provided with means for introducing water into the enclosure through the upper surface of the main body section.

6 Claims, 7 Drawing Figures

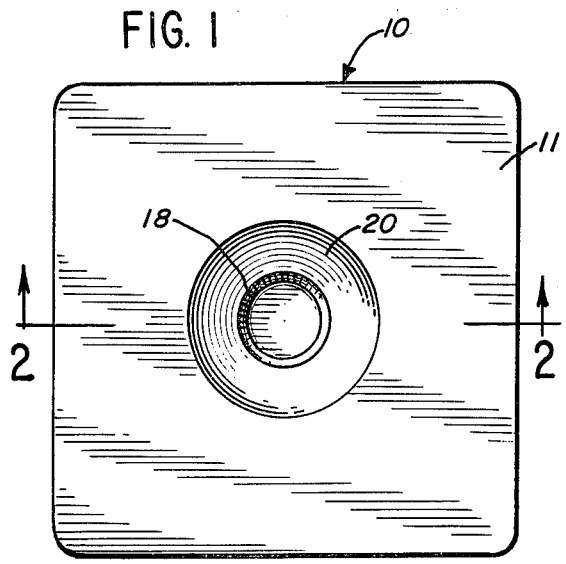
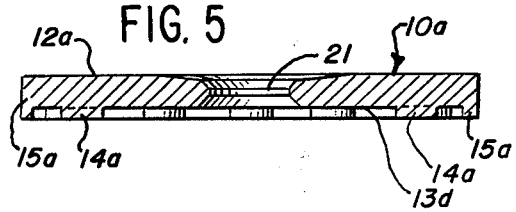
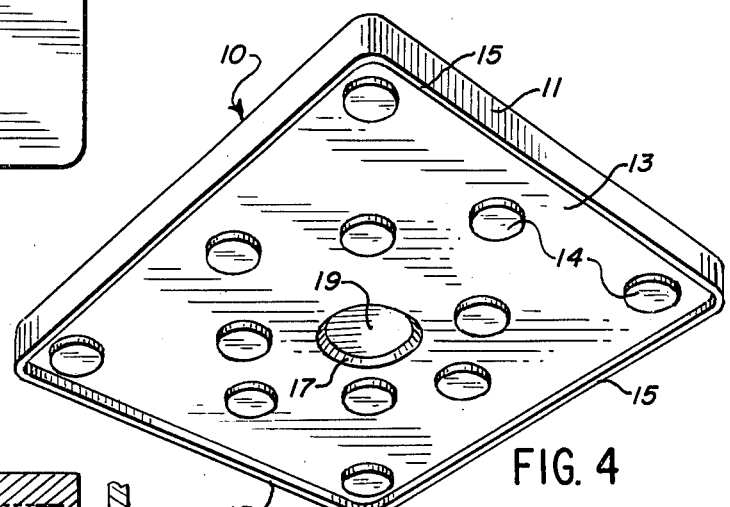
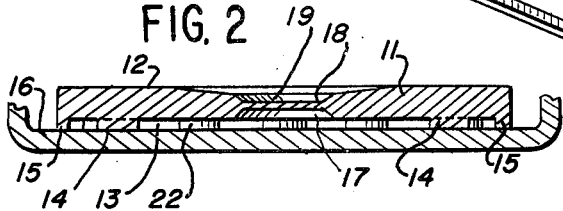
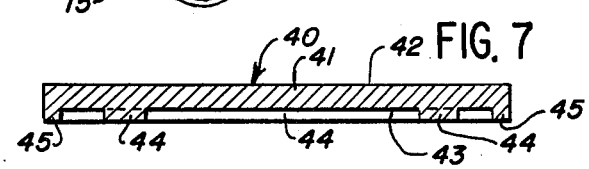
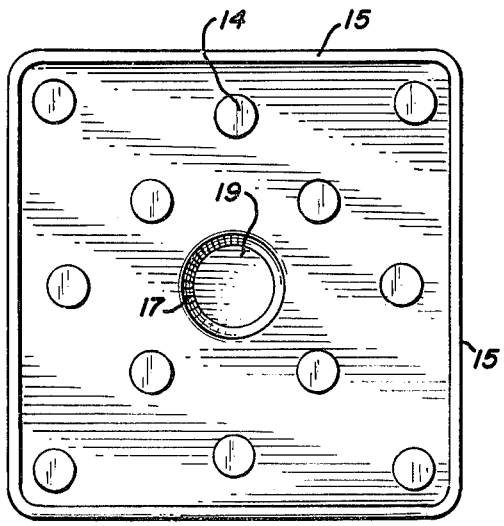
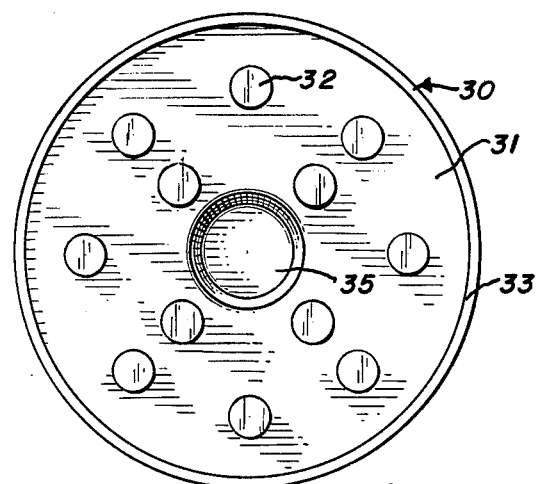

MELTABLE HARD CANDY ARTICLE

This invention relates generally to a novel precooked hard candy article in solid form and more particularly to a bar of precooked hard candy which is adapted to be readily melted without burning or scorching so as to form a crisp non-sticky glaze on an edible confection or food article coated therewith.

In making a hard candy composition suitable for use as a glaze for coating confections and food articles, such as popcorn, nuts, dried or fresh fruits and puffed cereals, equal portions of water, glucose syrup, white or brown sugar (or molasses in place of brown sugar) are normally combined along with a small amount of salt, artificial flavor and coloring, if desired. The solid ingredients are dissolved in water and cooked to remove moisture until reaching a sugar solids content of at least about 94% and up to 99% by weight so as to provide on cooling a crisp, non-sticky hard candy glaze on an article coated therewith. The precise point at which to discontinue heating is difficult to determine, particularly when making the hard candy in the home. Over or under cooking is a frequent source of difficulty. If the product is over cooked, the hard candy will have a burned flavor; and if under cooked, the hard candy will not form a crisp, glaze coating but rather forms a soft sticky coating which is undesirable.

In order to eliminate the tedious and exacting home cooking process of preparing a satisfactory hard candy glaze from the basic ingredients, it would be highly desirable to provide a commercially precooked hard candy article having the required sugar solids content suitable for making a glaze coating which can be readily remelted to form a desirable crisp, non-sticky, hard candy glaze. Precooked hard candy, however, has several properties which make it difficult to provide a commercially acceptable hard candy article which can be readily melted for use as a glaze without burning or scorching, particularly after the solid hard candy is held for a period normally required for the article to pass through commercial channels and before the article is used by the consumer. For example, hard candy must have a relatively high sugar solids content of at least about 94% by weight or higher (i.e. a maximum moisture content of 6% by weight) in order to provide the required crisp, non-sticky glaze coating. It is very difficult, however, to melt a hard candy having a high sugar solids content without burning or scorching the sugar during the melting process. While reducing the sugar solids content below about 94% reduces the difficulty of melting the product, a hard candy product having a solids content below 94% can not be held by the manufacturer, retailer or consumer for any appreciable period without the hard candy "sugaring" and becoming very difficult or impossible to melt. Furthermore, a precooked hard candy composition having a moisture content more than 6% by weight becomes sticky when held at a temperature above about 70° F. and is difficult to handle and package. Thus, a satisfactory commercial hard candy product suitable for preparing a crisp, non-sticky glaze and which exhibits good shelf life must have a solids content of at least 94% (i.e. a moisture content of not more than 6%) even though such a high solids content makes the hard candy product difficult to melt rapidly without burning or scorching. It is evident that it would be desirable to provide the hard candy in the form of a precooked bar having a high solids content (i.e. a maximum moisture content of 6% by wt.) which can be readily melted without burning or scorching.

It is, therefore, an object of the present invention to provide a novel precooked hard candy article which overcomes the foregoing difficulties and can be readily melted without burning or scorching to form a crisp, non-sticky glaze coating on an article coated therewith.

It is a further object of the present invention to provide a novel precooked hard candy bar having the foregoing characteristics which has a satisfactory shelf life and packaging characteristics.

Other objects of the present invention will be apparent to those skilled in the art from the following detailed description and claims to follow when read in conjunction with the accompanying drawing wherein;

FIG. 1 is a top plan view of one embodiment of a hard candy article made in accordance with the present invention;

FIG. 2 is a vertical sectional view taken along the line 2—2 of FIG. 1;

FIG. 3 is a bottom plan view of the article of FIG. 1;

FIG. 4 is a perspective view of the article of FIG. 1;

FIG. 5 is a vertical sectional view of a modified form of the present invention;

FIG. 6 is a bottom plan view of another modified form of the present invention; and FIG. 7 is a vertical sectional view of still another modified form of the present invention.

In achieving the objects of the present invention a precooked stable hard candy composition is provided in the form of a solid bar having a main body section with generally planar upper and lower surfaces in which the lower surface has a plurality of spaced supporting or footed projections extending downwardly a short distance below the plane of the lower surface of the main body section and a skirt element along the entire periphery of the main body section which extends downwardly below the plane of the lower surface of the main body section the same distance as the footed projections. The downwardly extending skirt element together with the footed projections are adapted to hold the main body section above the surface of a flat bottom cooking vessel and form an enclosed space or cavity below the main body section in which vapor or fluid and melted hard candy syrup are retained during the melting of the bar in the cooking vessel. Both the footed projections and the skirt element preferably have flat lower surfaces which are adapted to engage the flat surface of a cooking vessel used for melting the hard candy bar. The upper surface of the hard candy bar in one embodiment is provided with a "well" or central recess which is adapted to receive a small quantity of water. When water is poured in the central recess on the upper surface of the bar and a passage formed between the upper and lower surfaces, the water is conducted into the enclosure or cavity formed between the lower surface of the bar and the surface of the cooking vessel, as will be described hereinafter.

In FIGS. 1–4 of the drawing illustrating one embodiment of the present invention the hard candy bar 10 comprises a generally square main body section 11 having rounded corners, a planar upper surface 12 and a planar lower surface 13. A plurality of spaced footed projections 14 extend downwardly a short distance below the plane of the lower surface 13. Also, a continuous peripheral skirt 15 extends downwardly from the main body section 11 below the plane of the lower surface the same distance as the footed projections 14. The lower ends of the footed projections 14 and the skirt 15 preferably have a flat surface and form a close engagement with the flat upper surface of a cooking vessel 16 used to melt the bar 10, as will be described hereinafter. A central upwardly extending recess 17 is formed in the lower surface 13. The upper surface 12 is also provided with a central downwardly extending recess 18. A thin web or diaphragm 19 is formed between the central recesses 17, 18 which can be pierced to form a passage, if desired. The lateral surfaces of the recesses 17 and 18 are preferably tapered inwardly. The upper surface 12 is also preferably provided with a gradually tapered surface 20 extending around the central recess 18 and inclined toward the recess 18.

A hard candy bar 10 of the type shown in FIGS. 1–4 which is suitable for glazing one quart of popped popcorn is formed of hard candy having a solids content of about 94% by wt. (i.e. a moisture content of about 6%) and has a square configuration with dimensions of about 4.5 inches by 4.5 inches, a thickness of about ¼ inch, and a diagonal length of about six inches. The bar having the foregoing dimensions weighs about 5 ounces. Each of the depending footed projections 14 and the peripheral skirt 15 extends about 1/16th inch below the plane of the lower surface 13. The diaphragm 19 is disposed about midway between the upper surface 12 and lower surface 13 and has a diameter of about ¾ of an inch and has a thickness of about 1/16 of an inch. Each of the footed projections 14 is about 7/16 inch wide at the base. The skirt 15 is about ⅛ inch wide. The inwardly tapered section 20 on the upper surface 12 is a circular band about ¾ inch wide and has a 1/32 inch taper toward the recess 18.

The modified form of the hard candy bar 10a shown in FIG. 5 has a structure the same as that of the bar 10 shown in FIGS. 1–4, except that the central recesses 17a and 18a have a substantially smaller diameter than the corresponding recesses 17, 18, and the central recesses 17a, 18b do not have the inner ends thereof closed by a diaphragm, such as the diaphragm 19 shown in FIGS. 1–4. Thus, the bar 10a in FIG. 5 has a direct small diameter passage 21 formed therein between the upper surface 12a and the lower surface 13a which is adapted to conduct water from the upper surface 12a into the enclosure between the main body section 11a and the surface of the heating vessel 16 formed by the footed projections 14a and the peripheral skirt 15a.

In the further modified form of the invention in FIG. 6 the hard candy bar 30 has a circular main body section 31 with depending footed projections 32 and peripheral skirt 33, as in FIGS. 1–4. The bar 31 has a pierceable diaphragm 35 formed in the center thereof of the same type and dimensions as in FIGS. 1–4.

While means are provided in the hard candy bar structures shown in FIGS. 1–6 for introducing water prior to melting into the enclosure formed by the skirt element between the lower surface of the main body section of the bar and the cooking vessel, it is possible with the present invention to obtain a significant increase in the rate of melting of a hard candy bar while reducing the danger of burning or scorching without the necessity of adding the water through a central well or recess. Accordingly, in FIG. 7 another modified form of the present invention is shown in which the hard candy bar 40 has a main body section 41 with a planar upper surface 42 and a planar lower surface 43 which provides the main body section having a uniform thickness without a central well with a diaphragm or passage between the upper and lower surfaces thereof. The main body section 41 does have a plurality of spaced footed projections 44 which extend downwardly a short distance below the plane of the lower surface of the main body section 41. The main body section 41 also has a continuous peripheral skirt 45 extending downwardly below the plane of the lower surface 43 the same distance as the footed projections 44. The bar 40 can have a square or round configuration and except for the absence of a central diaphragm or passage can have a structure similar to that shown in FIGS. 1–4 and FIG. 6.

When a housewife or other user desires to prepare a glaze on a confection or food item with the hard candy bar 10 of FIGS. 1–4 or the bar 30 of FIG. 6 which have a sugar solids content of at least 94%, the hard candy bar 10 is placed in a cooking vessel 16, such as a conventional flat bottomed cooking pot, sufficiently large to allow the hard candy bar to be placed flat against the bottom of the heating vessel 16 and large enough to receive therein the quantity of confection or food item to be glazed. With the hard candy bar 10 so disposed in the heating vessel 16 with only the footed projections and the peripheral skirt in direct contact with the flat surface of the heating vessel 16, the central diaphragm 19 is pierced with a pointed device, such as a knife or fork, to provide a passage from the upper surface 12 into the cavity or enclosure 22 formed by the peripheral skirt 15 between the lower surface 13 of the main body section 11 and the upper surface of the cooking vessel 16. A teaspoon of water is poured into the well 18 of the hard candy bar, and the water is allowed to pass through the opening formed in the diaphragm 19 into the enclosure 22 formed below the main body section. As the vessel 16 is heated during the initial stage of cooking the hard candy, the water which is confined within the cavity or enclosure 22 is converted to steam and rapidly heats the main body section 11 of the candy bar 10. As the candy bar 10 is softened and the bar begins to melt under the combined effect of the heated water vapor and the contact between the footed projections 14 and skirt section 15 with the heating vessel 16, the bar begins to settle by its own weight and any of the footed projections 14 or portions of the skirt 15 which initially may not have been in sealing contact with the surface of the cooking vessel settle against the surface of the vessel and the skirt 15 forms a sealing engagement around the entire perimeter of the bar so that the formed vapors and syrup are retained beneath the main body section of the bar 10. After the initial cooking period of about 1 minute, two additional teaspoons of water are preferably poured into the well 18 or onto the tapered section 20 so that the water passes into enclosed space beneath the bar and is retained therein. The syrup and vapors formed as cooking is continued rapidly completes melting of the hard candy bar 10 and insures that the candy bar 10 does not burn or scorch while the hard candy bar is being melted or liquified. The presence of the film or syrup between the vessel bottom and the underside of the bar prevents scorching or burning and makes it possible to use a higher heat under the cooking vessel than would otherwise be possible without burning or scorching the candy bar during melting. Because very little water is lost as steam or fluid flowing from beneath the bar the time required to form a fluid syrup or glaze having the optimum solids content to provide a crisp, non-sticky glaze coating on popped popcorn or other food or condiment which is being glazed therewith, the time required for melting the bar is greatly reduced, and the danger of burning or scorching is substantially eliminated.

In the modified form of the hard candy bar 10a shown in FIG. 5 the same procedure for melting the bar is followed as used for the bar of FIGS. 1-4, except that there is no need to pierce a diaphragm in order to provide a small diameter passage between the upper and lower surface of the bar. While the size of the passage between the upper and lower surfaces of the bar is not critical, a smaller diameter passage will retain more of the vapors formed during heating and result in melting the bar to form a fluid syrup or glaze more rapidly without scorching or burning the bar during the melting thereof.

In preparing a glaze with the hard candy bar 40 of FIG. 7, about two tablespoons of water are poured into the heating vessel and the bar 40 is placed over the water in the vessel so that the skirt element 45 retains the added water or a significant portion thereof in the enclosure formed between the lower surface 43 and the cooking vessel. The vapors and syrup formed during the initial heating of the bar will be retained beneath the main body section 41 significantly accelerate the melting process.

The hard candy bar having the novel structure disclosed herein can have any desired outer dimensions so long as the resulting bar is of a size suitable for melting in a cooking vessel. The bar can be formed in any conventional candy molding apparatus, such as flat plate mold or a rotary-type mold. All of the lateral wall surfaces of the hard candy bar are preferably tapered slightly to facilitate rapid release of the bar from the mold.

The hard candy used to form the hard candy bars of the present invention can be made by any conventional method for producing hard candy providing a sugar solids content of at least 94% by wt. (i.e. a maximum moisture content of 6%). The term "sugar solids" is used to designate all of the non-liquid ingredients of the candy composition.

I claim:

1. A hard candy article adapted to be rapidly melted in a flat bottom cooking vessel without burning or scorching to form on cooling a brittle non-sticky glaze coating on a confection or food item, said hard candy article comprising a precooked hard candy bar having a maximum moisture content of 6 percent by weight and having a main body section with generally planar upper and lower surfaces, said main body section having a plurality of spaced projections extending downwardly below the plane of the lower surface, and a continuous peripheral skirt which extends downwardly along the entire periphery of the bar below the plane of the main body section the same distance as said projections; whereby said skirt and main body section together with the bottom of said cooking vessel are adapted to form an enclosure for retaining fluid and melted candy syrup beneath said main body section when said bar is heated in the flat bottom cooking vessel to effect melting of said bar.

2. A hard candy article as in claim 1, wherein said projections and skirt have flat lower surfaces.

3. A hard candy article as in claim 1, wherein a central recess is formed in the main body section which includes means for providing a passage between the upper and lower surface of the main body section for introducing water into said enclosure.

4. A hard candy article as in claim 1, wherein a central recess in the main body section has a thin pierceable diaphragm closing the lower end thereof which is adapted when pierced to form a passage between said upper and lower surfaces.

5. A hard candy article in main claim 1, wherein said main body section has a substantially uniform thickness with an imperforate main body section.

6. A method of preparing a precooked hard candy composition suitable for glaze-coating a food article in melted form without burning or scorching the hard candy composition which forms on cooling, a brittle, non-sticky coating, said method comprising; forming a hard candy composition containing a maximum moisture content of 6% by wt. into a bar having a main body section with generally planar upper and lower surfaces having a plurality of spaced projections extending downwardly below the plane of the lower surface and a continuous peripheral skirt which extends downwardly along the entire periphery of the bar below the plane of the main body section the same distance as the said projections, placing said bar in a cooking vessel having a flat bottom with said peripheral skirt enclosing a quantity of water on said flat bottom of the cooking vessel, and heating the said vessel to effect melting of the hard candy composition while heated water and water vapor are retained in an enclosure formed by the main body section and peripheral skirt together with the flat bottom of the cooking vessel.

* * * * *

UNITED STATES PATENT AND TRADEMARK OFFICE
CERTIFICATE OF CORRECTION

PATENT NO. : 4,158,064

DATED : June 12, 1979

INVENTOR(S) : Benjamin Banowitz, North Miami Beach, Fla.

It is certified that error appears in the above-identified patent and that said Letters Patent are hereby corrected as shown below:

In the designation of the Assignee on the cover page, delete:

"TV Time, Inc., Chicago, Ill."

and substitute:

--TV TIME FOODS, INC.

Signed and Sealed this

Fifteenth Day of January 1980

[SEAL]

Attest:

SIDNEY A. DIAMOND

Attesting Officer

Commissioner of Patents and Trademarks